United States Patent
Matsumoto et al.

(10) Patent No.: US 7,208,744 B2
(45) Date of Patent: Apr. 24, 2007

(54) RADIATION IMAGE STORAGE PANEL

(75) Inventors: Hiroshi Matsumoto, Kanagawa (JP); Hiroki Saito, Kanagawa (JP); Hideki Suzuki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 36 days.

(21) Appl. No.: 11/062,753

(22) Filed: Feb. 23, 2005

(65) Prior Publication Data

US 2005/0194547 A1    Sep. 8, 2005

(30) Foreign Application Priority Data

Feb. 23, 2004    (JP) .............................. 2004-046282

(51) Int. Cl.
*G03B 42/08*    (2006.01)

(52) U.S. Cl. .................... 250/484.4; 427/593

(58) Field of Classification Search ............. 250/484.4, 250/484.3, 484.2, 486.1, 582; 427/593
See application file for complete search history.

(56) References Cited

U.S. PATENT DOCUMENTS 4,782,237 A    11/1988    Teraoka et al.
5,877,504 A *   3/1999   Yanagita et al. .......... 250/484.4
6,452,192 B1    9/2002   Kohda
6,652,994 B2 * 11/2003   Yanagita et al. ............ 428/690
6,713,776 B2    3/2004   Takahashi

FOREIGN PATENT DOCUMENTS

JP    09-269400        10/1997
JP    2000-284097      10/2000

* cited by examiner

*Primary Examiner*—David Porta
*Assistant Examiner*—Faye Boosalis
(74) *Attorney, Agent, or Firm*—Sughrue Mion, PLLC

(57) ABSTRACT

A radiation image storage panel composed at least of a phosphor layer containing energy-storable phosphor particles and a light-reflecting layer provided on one side of the phosphor layer, in which the energy-storable phosphor particles are composed of at least two kinds of particles having different mean sizes, one of which is composed of smaller particles having a mean size of 2.0 to 4.0 μm and the other of which is composed of larger particles having a mean size of 6.0 to 15 μm, and a weight ratio between the smaller particles and the larger particles is in the range of 10:90 to 50:50 (former:latter), and in which the light-reflecting layer gives a scattering length of 5 μm or less (the scattering length is for a stimulating light).

10 Claims, 1 Drawing Sheet

FIGURE
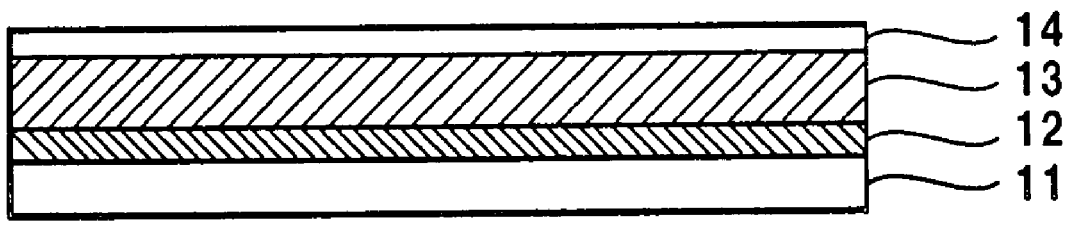

RADIATION IMAGE STORAGE PANEL

FIELD OF THE INVENTION

The present invention relates to a radiation image storage panel employable in a radiation image recording and reproducing method utilizing an energy-storable phosphor.

BACKGROUND OF THE INVENTION

When exposed to radiation such as X-rays, an energy-storable phosphor (such as stimulable phosphor which gives off stimulated emission) absorbs and stores a portion of the radiation energy. The phosphor then emits stimulated emission according to the level of the stored energy when exposed to electromagnetic wave such as visible or infrared light (i.e., stimulating light). A radiation image recording and reproducing method utilizing the energy-storable phosphor has been widely employed in practice. In that method, a radiation image storage panel, which is a sheet comprising the energy-storable phosphor, is used. The method comprises the steps of: exposing the storage panel to radiation having passed through an object or having radiated from an object, so that radiation image information of the object is temporarily recorded in the panel; sequentially scanning the storage panel with a stimulating light such as a laser beam to emit stimulated light; and photoelectrically detecting the emitted light to obtain electric image signals. The storage panel thus treated is subjected to a step for erasing radiation energy remaining therein, and then stored for the use in the next recording and reproducing procedure. Thus, the radiation image storage panel can be repeatedly used.

The radiation image storage panel (often referred to as energy-storable phosphor sheet) used in the radiation image recording and reproducing method has a basic structure comprising a support and a phosphor layer provided thereon. However, if the phosphor layer is self-supporting, the support may be omitted. Further, a protective layer is normally provided on the free surface (surface not facing the support) of the phosphor layer to keep the phosphor layer from chemical deterioration or physical shock.

Various kinds of phosphor layers are known and used. For example, a phosphor layer comprising a binder and an energy-storable phosphor dispersed therein is generally used, and a phosphor layer comprising agglomerate of an energy-storable phosphor without binder is also known. The latter layer can be formed by a gas phase-accumulation method or by a firing method. Further, still also known is a phosphor layer comprising energy-storable phosphor agglomerate impregnated with a polymer material.

The radiation image recording and reproducing method (or radiation image forming method) has various advantages as described above. Nevertheless, it is still desired that the radiation image storage panel used in the method have as high sensitivity as possible and, at the same time, give a reproduced radiation image of high quality (in regard to sharpness and graininess).

JP-B-4-75480 discloses a radiation image storage panel which comprises a phosphor layer containing a mixture of two kinds of stimulable phosphor particles having the same chemical composition but different sizes. The smaller particles have a size distribution in which the peak is positioned in the range of 1 to 8 μm, and the larger particles have another size distribution in which the peak is positioned in the range of 4 to 30 μm. (The difference between those peaks is at least 2 μm.) In the mixture, the weight ratio between the smaller particles and the larger particles is from 20:80 to 90:10.

JP-A-9-269400 discloses a radiation image storage panel comprising a phosphor layer in which the packing percentage of phosphor particles is 65% or more. The phosphor layer of the storage panel contains a mixture of smaller stimulable phosphor particles and larger phosphor particles. The smaller particles have a size distribution in which the peak (A) is positioned in the range of 0.5 to 5 μm, and the larger particles have another size distribution in which the peak (B) is positioned in the range of 6 to 30 μm. The weight ratio between the particles of the peak A and those of the peak B is from 5:95 to 40:60. The particles of the peak B are larger than those of the peak A by 5 μm or more, or otherwise are three times or more as large as those of the peak A.

JP-A-2000-284097 discloses a radiation image storage panel utilizing, as the stimulable phosphor particles, rare earth activated alkaline earth metal halide phosphor particles in the shape of tetradecahedron. The mean size (Dm) of the phosphor particles is from 3.5 to 7.5 μm, and the size distribution (Q) thereof is from 0.500 to 0.800. The publication also discloses that the phosphor particles having sizes of 5.0 to 8.0 μm and those having sizes of 2.0 to 4.0 μm are mixed in the ratio of 95:5 to 50:50.

JP-A-2001-124898 discloses a radiation image storage panel which comprises a phosphor layer containing stimulable phosphor and a light-reflecting layer containing light-reflecting material. The light-reflecting layer is provided on one side of the phosphor layer, and gives a scattering length of 5 μm or less when scattering a stimulating ray, which excites the stimulable phosphor.

SUMMARY OF THE INVENTION

An object of the present invention is to provide a highly sensitive radiation image storage panel which produces a radiation image of high quality.

With respect to the radiation image storage panel comprising a phosphor layer and a light-reflecting layer placed on the phosphor layer, the present inventors have studied to find out what phosphor composition enables the light-reflecting layer to work most effectively in the case where the light-reflecting layer scatters a stimulating light so efficiently that the scattering length is made to 5 μm or less. As a result, the inventors have found that a storage panel comprising a phosphor layer in which a mixture of two kinds of phosphor particles each having specific mean sizes is contained in a specific mixing ratio is highly sensitive and is improved in both structural mottles and quantum noises. Accordingly, the radiation image storage panel of the invention produces a radiation image excellent in graininess.

The present invention resides in a radiation image storage panel which comprises a phosphor layer containing energy-storable phosphor particles and a light-reflecting layer provided on one side of the phosphor layer; characterized in that the energy-storable phosphor particles comprise two kinds of particles having different mean sizes, one of which is in the range of 2.0 to 4.0 μm and the other of which is in the range of 6.0 to 15 μm, and the ratio by weight between the smaller particles and the larger particles is in the range of 10:90 to 50:50 (former:latter); and also characterized in that the light-reflecting layer gives a scattering length of 5 μm or less when scattering a stimulating light, which excites the energy-storable phosphor.

The radiation image storage panel of the invention, which comprises a very efficient light-reflecting layer and a phosphor layer comprising specific phosphor particles, has high sensitivity and gives a radiation image of high graininess. Accordingly, the radiation image storage panel of the invention can be advantageously used for medical diagnoses.

BRIEF DESCRIPTION OF THE DRAWINGS

FIGURE is a sectional view schematically illustrating an example of the structure of radiation image storage panel according to the invention.

DETAILED DESCRIPTION OF THE INVENTION

In the invention, the smaller phosphor particles preferably has a mean particle size in the range of 2.0 to 3.0 μm and the larger ones preferably has a mean particle size in the range of 6.0 to 10 μm.

The energy-storable phosphor particles are packed in the phosphor layer so that the packing percentage preferably is 65 vol. % or more.

The energy-storable phosphor particles preferably are in the shape of tetradecahedron.

In the following description, the radiation image storage panel of the invention is explained in detail with reference to the attached drawing.

FIGURE is a sectional view schematically illustrating an example of the structure of radiation image storage panel according to the invention. The storage panel comprises a support 11, a light-reflecting layer 12, an energy-storable phosphor layer 13 and a protective layer 14, placed in order.

The light-reflecting layer 12 generally comprises fine particles of light-reflecting material and a binder dispersing and supporting the particles. The light-reflecting layer scatters a stimulating light so that the scattering length would be made to 5 μm or less, preferably 4 μm or less. In this specification, "scattering length" means an average distance in which the stimulating light travels until once scattered, and hence a short scattering length indicates that the light is highly scattered. The scattering length can be calculated according to Kubeluka-Munk theory from transmittance measured in the following manner.

First, three or more film samples are prepared. They should have different thicknesses but are made of the same material as the light-reflecting layer of the storage panel to be examined. The thickness (μm) and transmittance (%) of each film sample are then measured. The transmittance can be measured by means of an ordinary spectrophotometer. The wavelength at which the transmittance is measured should be the same as the wavelength of the stimulating light, which excites the energy-storable phosphor contained in the phosphor layer.

Second, from the obtained thickness (μm) and transmittance (%) of each film, the scattering length is calculated according to Kubeluka-Munk theory. In the following description, the thickness, scattering length and absorption length of the film are represented by d (μm), $1/\alpha$ (μm) and $1/\beta$ (μm), respectively. The distribution of light intensity at the depth Z, which is represented by $I(Z)$, is composed of two components $i(Z)$ and $j(Z)$, which are attributed to light travelling from the top to the bottom and light travelling from the bottom to the top, respectively. They, therefore, satisfy the equation of $I(Z)=i(Z)+j(Z)$. According to Kubeluka-Munk theory, the change of light intensity caused by scattering and/or by absorption within a minute thickness (dz) at the depth (Z) can be estimated from the following simultaneous differential equations (1) and (2):

$$di/dz=-(\beta+\alpha)i+\alpha j \quad (1)$$

$$dj/dz=(\beta+\alpha)j-\alpha i \quad (2).$$

The general solutions of the equations (1) and (2) are the following functions:

$$i(Z)=Ke^{-\gamma Z}+Le^{\gamma Z}$$

$$j(Z)=K\xi e^{-\gamma Z}+L\eta e^{\gamma Z}$$

in which $\gamma$, $\xi$ and $\eta$ are defined by the formulas:

$\gamma^2=\beta(\beta+2\alpha)$, $\xi=(\alpha+\beta-\gamma)/\alpha$ and $\eta=(\alpha+\beta+\gamma)/\alpha$, respectively;

and K and L are integral constants.

Meanwhile, the transmittance T of the film having the thickness d is represented by the formula:

$$T=i(d)/i(0).$$

On the assumption that light does not come back from the bottom to the top [namely, on the assumption of $j(d)=0$] in measuring a single film, the transmittance T is a function of the thickness d represented by the following formula (3):

$$T(d)=(\eta-\xi)/(\eta e^{\gamma Z}-\xi e^{-\gamma Z}) \quad (3).$$

The formula (3) is applied to the above-obtained data of transmittance T and thickness d, and optimized by, for example, the least-squares method to determine the scattering length and absorption length $1/\alpha$ (μm) and $1/\beta$ (μm), respectively.

The energy-storable phosphor layer 13 generally comprises energy-storable phosphor particles and a binder dispersing and supporting the phosphor particles, and the phosphor particles comprise two kinds of particles having different sizes. The smaller phosphor particles (smaller particles) have a mean size of 2.0 to 4.0 μm, preferably 2.0 to 3.0 μm. The larger phosphor particles (larger particles) have a mean size of 6.0 to 15 μm, preferably 6.0 to 10 μm. In the specification, the "mean size" is a median diameter (Dm) meaning a center particle size at which the cumulative distribution reaches 50% of the number of whole particles. The cumulative distribution is obtainable from a distribution curve which is prepared by plotting number of the particles (frequency) against the size (diameter). The mixing ratio between the smaller particles and the larger particles is in the range of 10:90 to 50:50 (former:latter) by weight.

In the invention, the light-reflecting layer shows such a short scattering length that the stimulating light is scattered enough and hence that the reflection efficiency is enhanced enough to increase the amount of the emission produced by the energy-storable phosphor particles in the phosphor layer. On the other hand, since the phosphor layer contains the above-described particles of the phosphor, structural mottles and quantum noises of the storage panel are so reduced that a radiation image improved in graininess can be obtained. Accordingly, the radiation image storage panel of the invention gives off the emission in an increased amount, and at the same time provides a radiation image remarkably improved in image quality, particularly in graininess.

In order to increase absorption of radiation such as X-rays, the packing degree of energy-storable phosphor particles in the phosphor layer 13 preferably is 65 vol. % or more. The phosphor layer also preferably shows a scattering length of 5 to 20 μm when scattering the stimulating light and the emission, from the viewpoint of enhancement of the image quality.

The radiation image storage panel of the invention can be produced, for example, in the following manner.

Generally, the support is a soft resin sheet or film having a thickness of 50 μm to 1 mm. The support may be transparent, may contain light-reflecting material (e.g., particles of alumina, titanium dioxide, and barium sulfate) or voids for reflecting the stimulating light or the emission, or may contain light-absorbing material (carbon black) for absorbing the stimulating light or the emission. Examples of the resin materials employable for producing the support include polyethylene terephthalate, polyethylene naphthalate, aramide resin and polyimide resin. For improving the sharpness of the reproduced radiation image, fine concaves and convexes may be formed on the phosphor layer-side surface of the support (or on the phosphor layer-side surface of an auxiliary layer such as a subbing layer, a light-reflecting layer or a light-absorbing layer, if they are provided). The support may be a sheet of metal, ceramics or glass, if desired.

On the support, the light-reflecting layer comprising particles of light-reflecting material and a binder is provided. Examples of the light-reflecting materials include white pigments such as $Al_2O_3$, $ZrO_2$, $TiO_2$, MgO, $BaSO_4$, $SiO_2$, ZnS, ZnO, $CaCO_3$, $Sb_2O_3$, $Nb_2O_5$, $2PbCO_3 \cdot Pb(OH)_2$, $PbF_2$, $BiF_3$, $Y_2O_3$, YOCl, $M^{II}FX$ (in which $M^{II}$ is at least one selected from the group consisting of Ba, Sr and Ca; and X is at least one selected from the group consisting of Cl and Br), lithopone ($BaSO_4$ and ZnS), magnesium silicate, basic lead silicate sulfate, basic lead phosphate, and aluminum silicate; and hollow polymer. They may be used singly or in combination. Particularly preferred are $Al_2O_3$, $Y_2O_3$, $ZrO_2$ and $TiO_2$, which have such a high refractive index that the scattering length can be easily made to 5 μm or shorter.

In order to prepare the light-reflecting layer giving the short scattering length, the particles of light-reflecting material may be made to have diameters as close as possible to the wavelength of the stimulating light and/or made to have not a spherical shape but a deformed one. In more detail, the mean diameter of the particles preferably is ¼ to 2 times as long as the wavelength of the stimulating light. In other words, the mean size of the particles preferably is in the range of 0.1 to 2.0 μm because the stimulating light generally is in the wavelength range of 500 to 800 nm.

The BET specific surface area (surface area per unit weight) of the light-reflecting material generally is 1.5 m²/g or more, preferably in the range of 2 to 10 m²/g, more preferably in the range of 2.5 to 8 m²/g. The bulk density (closest packing density) of the reflecting material preferably is 1 mg/cm³ or less, more preferably 0.6 mg/cm³ or less.

The light-reflecting material in the form of fine particles is incorporated into the light-reflecting layer under the condition that voids as many as possible are produced in the reflecting layer. Because of thus-formed voids, the reflecting layer can have such a high refractive index that the short scattering length can be given without aggregating the particles.

The light-reflecting layer can be formed by the steps of: preparing a coating solution in which the fine particles of light-reflecting material and a binder are dispersed or dissolved in an organic solvent, evenly spreading the coating solution to coat the surface of the support, and drying the coated solution. The weight ratio of the binder to the light-reflecting particles in the coating solution generally is in the range of 1/10 to 1/50 (by weight), preferably in the range of 1/10 to 1/20 (by weight). The binder and the organic solvent can be optionally selected from those described later for preparing the coating solution from which the phosphor layer is formed. The coating solution may contain a surface-treatment agent such as an aluminum coupling agent, a titanate coupling agent or a silane coupling agent, so that the light-reflecting particles can be well dispersed. The coating procedure can be carried out by ordinary means such as a doctor blade, a roll coater or a knife coater. The thickness of the light-reflecting layer generally is in the range of 5 to 500 μm, preferably in the range of 20 to 200 μm.

For increasing the adhesion between the support and the light-reflecting layer, an adhesive layer made of polyester resin or acrylic resin may be provided.

On the light-reflecting layer, a phosphor layer comprising particles of energy-storable phosphor is provided. The energy-storable phosphor preferably is a stimulable phosphor giving off stimulated emission in the wavelength region of 300 to 500 nm when exposed to a stimulating light in the wavelength region of 400 to 900 nm. Preferred examples of the stimulable phosphor include europium or cerium activated alkaline earth metal halide stimulable phosphors [e.g., BaFBr:Eu and BaF(Br, I):Eu] and cerium activated rare earth oxyhalide phosphors.

Particularly preferred is a rare earth activated alkaline earth metal fluoride halide stimulable phosphor represented by the formula (I):

$$M^{II}FX:zLn \qquad (I)$$

in which $M^{II}$ is at least one alkaline earth metal selected from the group consisting of Ba, Sr and Ca; Ln is at least one rare earth element selected from the group consisting of Ce, Pr, Sm, Eu, Tb, Dy, Ho, Nd, Er, Tm and Yb; X is at least one halogen selected from the group consisting of Cl, Br and I; and z is a number satisfying the condition of $0 < z \leq 0.2$.

In the formula (I), $M^{II}$ preferably comprises Ba more than half of the total amount of $M^{II}$, and Ln is preferably Eu or Ce. The $M^{II}FX$ in the formula (I) represents a matrix crystal structure of BaFX type, and it by no means indicates stoichiometrical composition of the phosphor though appearing F:X=1:1. It is generally preferred that the BaFX type crystal have many $F^+(X^-)$ centers corresponding to vacant lattice points of $X^-$ ions since they increase the efficiency of stimulated emission in the wavelength region of 600 to 700 nm. In that case, F is often slightly in excess of X.

Although omitted from the formula (I), one or more additives such as bA, $wN^I$, $xN^{II}$ and $yN^{III}$ may be incorporated into the phosphor of the formula (I), if needed. In the above, A stands for a metal oxide such as $Al_2O_3$, $SiO_2$ or $ZrO_2$. In order to keep $M^{II}FX$ particles from sintering, the metal oxide preferably has low reactivity with $M^{II}FX$ and the primary particles of the oxide are preferably super-fine particles of 0.1 μm or less diameter. $N^I$ is a compound of at least one alkali metal selected from the group consisting of Li, Na, K, Rb and Cs; $N^{II}$ is a compound of alkaline earth metal(s) Mg and/or Be; and $N^{III}$ is a compound of at least one trivalent metal selected from the group consisting of Al, Ga, In, Tl, Sc, Y, La, Gd and Lu. The metal compounds are preferably halides, but are not restricted to them.

In the above formulas, b, w, x and y represent amounts of the additives incorporated into the starting materials, based on one mole of $M^{II}FX$. They are numbers satisfying the conditions of $0 \leq b \leq 0.5$, $0 \leq w \leq 2$, $0 \leq x \leq 0.3$ and $0 \leq y \leq 0.3$, respectively. These numbers not always represent the contents in the resultant phosphor because the additives often decrease during the steps of firing and washing performed thereafter. Some additives remain in the resultant phosphor as they are added to the starting materials, but the others react with $M^{II}FX$ or are involved in the matrix.

In addition, the phosphor of the formula (II) may further contain, if needed, Zn and Cd compounds; metal oxides such as $TiO_2$, BeO, MgO, CaO, SrO, BaO, ZnO, $Y_2O_3$, $La_2O_3$, $In_2O_3$, $GeO_2$, $SnO_2$, $Nb_2O_5$, $Ta_2O_5$ and $ThO_2$; Zr and Sc compounds; B compounds; As and Si compounds; tetrafluoroborate compounds; hexafluoro compounds such as monovalent or divalent salts of hexafluorosilicic acid, hexafluorotitanic acid and hexafluorozirconic acid; or compounds of transition metals such as V, Cr, Mn, Fe, Co and Ni. The phosphor usable in the invention is not restricted to the above, and any phosphor that can be essentially regarded as rare earth activated alkaline earth metal fluoride halide stimulable phosphor can be used.

The stimulable phosphor represented by the formula (I) generally is in the form of particles having an aspect ratio of 1.0 to 5.0. The particles of the energy-storable phosphor in the invention preferably have an aspect ratio of 1.0 to 2.0 (more preferably 1.0 to 1.5). In the particle size distribution, σ/Dm (in which σ represents the standard deviation) preferably is 50% or less (more preferably 40% or less). The shape of the particle is rectangular parallelepiped, regular hexahedron, regular octahedron, tetradecahedron, intermediate polyhedron, or irregular shape. Tetradecahedron is preferred.

The phosphor usable in the invention is not restricted to the stimulable phosphors represented by the formula (I).

In the preparation of the phosphor layer, small phosphor particles having a mean size (Dm) of 2.0 to 4.0 μm and large particles having a mean size (Dm) of 6.0 to 15 μm are mixed in a ratio of 10:90 to 50:50.

For the formation of the phosphor layer, the above mixture of energy-storable phosphor particles and a binder are dispersed or dissolved in an appropriate organic solvent to prepare a coating solution. The ratio between the binder and the phosphor in the solution is normally in the range of 1:1 to 1:100 (by weight), preferably 1:10 to 1:50 (by weight).

As the binder dispersing and supporting the phosphor particles, various resin materials are generally known. Examples of the binder materials include natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl(meth)acrylate, vinyl chloride-vinyl acetate copolymer, polyurethane, cellulose acetate butyrate, polyvinyl alcohol, linear polyester, and thermoplastic elastomers. These may be cross-linked with a cross-linking agent.

Examples of the solvents employable in preparation of the coating solution for the phosphor layer include lower aliphatic alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower aliphatic alcohols with lower aliphatic acids such as methyl acetate, ethyl acetate and butyl acetate; ethers such as dioxane, ethyleneglycol monoethyl ether, ethyleneglycol monomethyl ether and tetrahydrofuran; and mixtures thereof.

The coating solution may contain various additives such as a dispersing aid to assist the phosphor particles in dispersing, a plasticizer for enhancing the bonding between the binder and the phosphor particles, an anti-yellowing agent for preventing the layer from undesirable coloring, a hardening agent, and a crosslinking agent.

The prepared coating solution is then evenly spread on the surface of the light-reflecting layer with the aforementioned coating means, and dried to form an energy-storable phosphor layer. The thickness of the phosphor layer is chosen according to various conditions such as characteristics of the desired storage panel, properties of the phosphor and the mixing ratio between the binder and the phosphor, but generally is in the range of 20 μm to 1 mm, preferably in the range of 50 to 500 μm.

Thus formed phosphor layer may be compressed by means of, for example, a calendering machine. By the compression, the packing percentage of the energy-storable phosphor particles in the layer can be increased to 65 vol. % or more.

The phosphor layer preferably gives a scattering length in the range of 5 to 20 μm in the scattering of a stimulating light and a stimulated emission.

In the formation of the phosphor layer, various conditions are controlled in order that the phosphor layer can give the desired scattering length. For example, the mixing ratio between the binder and the phosphor preferably is set in the range of 1:10 to 1:50, the mean particle size of the phosphor particles preferably is controlled in the range of 2 to 10 μm, and/or the packing percentage of the phosphor particles is preferably adjusted to 60 vol. % or more.

The energy-storable phosphor layer does not always need to be a single layer, and may consist of two or more sub-layers. In that case, at least one sub-layer contains the aforementioned mixture of small and large phosphor particles. The other sub-layers may comprise different compositions. For example, they may differ in the phosphor in regard to the compound or the particle size or in the ratio between the phosphor and the binder. In other words, the sub-layers can be optimally designed so that the emission character of the phosphor layer can suit the use of the storage panel or so that suitable scattering or absorption characters can be obtained. Further, it is not necessary to form the phosphor layer directly on the light-reflecting layer. For example, the phosphor film beforehand formed on a separate substrate (temporary support) may be peeled off and then fixed on the light-reflecting layer with an adhesive.

On the energy-storable phosphor layer, a protective layer is preferably provided to ensure good handling of the storage panel in transportation and to avoid deterioration. The protective layer preferably is transparent so as not to prevent the stimulating light from coming in or not to prevent the stimulated emission from coming out. Further, for protecting the storage panel from chemical deterioration and physical damage, the protective layer preferably is chemically stable, physically strong, and of high moisture proof.

The protective layer can be provided by coating the phosphor layer with a solution in which a transparent organic polymer (e.g., cellulose derivatives, polymethyl methacrylate, fluororesins soluble in organic solvents) is dissolved in an appropriate solvent, by placing a beforehand prepared transparent organic polymer sheet (e.g., a film of organic polymer such as polyethylene terephthalate) on the phosphor layer with an adhesive, or by depositing vapor of inorganic compounds on the phosphor layer. Various additives may be incorporated into the protective layer. Examples of the additives include light-scattering fine particles (e.g., particles of magnesium oxide, zinc oxide, titanium dioxide and alumina), a slipping agent (e.g., powder of perfluoroolefin resin or silicone resin) and a cross-linking agent (e.g., polyisocyanate). The thickness of the protective layer generally is in the range of about 0.1 to 20 µm.

For enhancing the resistance to stain, a fluororesin layer may be provided onto the protective layer. The fluororesin layer can be formed by coating the surface of the protective layer with a solution in which a fluororesin is dissolved (or dispersed) in an organic solvent, and then by drying the applied solution. The fluororesin may be used singly, but a mixture of the fluororesin and a film-forming resin is normally employed. In the mixture, an oligomer having polysiloxane structure or perfluoro-alkyl group can be further added. In the fluororesin layer, fine particle filler may be incorporated to reduce blotches caused by interference and to improve quality of the reproduced radiation image. The thickness of the fluororesin layer generally is in the range of 0.5 to 20 µm. For forming the fluororesin layer, additives such as a cross-linking agent, a film-hardening agent and an anti-yellowing agent can be used. In particular, the cross-linking agent is advantageously employed to improve durability of the fluororesin layer.

Thus, the radiation image storage panel of the invention can be produced. The storage panel of the invention may be in known various structures. For example, in order to improve the sharpness of the resultant image, at least one of the layers may be colored with a colorant which does not absorb the stimulated emission but the stimulating light. Further, another phosphor layer comprising a phosphor which absorbs radiation and instantly emits ultraviolet or visible light (namely, a layer of radiation-absorbing phosphor) may be provided. Examples of that phosphor include phosphors of $LnTaO_4$:(Nb, Gd) type, $Ln_2SiO_5$:Ce type and LnOX:Tm type (Ln is a rare earth element); CsX (X is a halogen); $Gd_2O_2S$:Tb; $Gd_2O_2S$:Pr,Ce; $ZnWO_4$; $LuAlO_3$:Ce; $Gd_3Ga_5O_{12}$:Cr,Ce; and $HfO_2$.

The present invention is further described by the following examples.

EXAMPLE 1

(1) Preparation of Phosphor Sheet

The following materials were placed in 86 g of methyl ethyl ketone (MEK), and mixed and dispersed by agitating at 10,000 r.p.m. for 30 minutes by means of a propeller mixer to prepare a coating solution having a viscosity of 3 Pa·s (binder/phosphor: 1/30, by weight). Independently, a polyethylene terephthalate sheet (temporary support, thickness: 190 µm) beforehand coated with a silicone releasing agent was prepared. The coating solution was then spread (width: 300 mm) with a coating machine on the releasing agent-coated surface of the temporary support, and dried to form a dry film. The dry film was then peeled from the temporary support, to obtain a phosphor sheet (thickness: 400 µm).

| | |
|---|---|
| Phosphor: two kinds of $BaF(Br_{0.85}I_{0.15})$: $Eu^{2+}$ phosphor particles in the shape of tetradecahedron [mean particle size (Dm) and mixing ratio are set forth in Table 1] | (in total) 1,000 g |
| Binder: polyurethane elastomer [MEK solution (solid content: 13 wt. %) of Pandex T5265H, Dainippon Ink & Chemicals, Inc.] | 182 g |
| Crosslinking agent: polyisocyanate resin [Colonate HX (solid content: 100%), Nippon Polyurethane Co., Ltd.] | 3 g |
| Anti-yellowing agent: epoxy resin [Epikoat #1001 (solid), Yuka Shell Epoxy] | 6.7 g |

(2) Formation of Light-reflecting Layer

The following materials were placed in 387 g of MEK, and mixed and dispersed to prepare a coating solution having a viscosity of approx. 2 to 3 Pa·s. The coating solution was spread with a coating machine to place on a polyethylene terephthalate sheet (support, thickness: 188 µm, haze: approx. 27, Lumilar S-10, Toray Industries, Inc.), and dried to form a light-reflecting layer (thickness: approx. 100 µm).

| | |
|---|---|
| Light-reflecting material: Fine particles of extra-pure alumina [mean size: 0.4 µm, UA-5105, Showa Denko K. K.] | 444 g |
| Binder: Soft acrylic resin [Criscoat P-1018GS (20% toluene solution), Dai-nippon Ink & Chemicals, Inc.] | 100 g |
| Colorant: ultramarine [SM-1, Daiichi Chemical Industry Co.,, Ltd.] | 2.2 g |

(3) Preparation of Phosphor Layer (Heat-compression Treatment)

The phosphor sheet was placed on the light-reflecting layer provided on the support, so that the bottom (surface having been in contact with the temporary support in preparation) of the phosphor sheet would be in contact with the light-reflecting layer. Thus-formed laminate was then heated and compressed with a calendering machine [total load: 2,300 kg, temperature of upper roller: 45° C., temperature of lower roller: 45° C., transferring speed: 0.3 m/min.]. As a result, the phosphor layer was completely combined with the light-reflecting layer. The phosphor layer thus subjected to the heat-compression treatment had the thickness of 300 µm, and the packing density of the phosphor particles therein was 3.61 g/cm³ (packing percentage: 69 vol. %).

(4) Preparation of Protective Layer

The following materials were placed in 38 g of methyl ethyl ketone, and mixed and dispersed to prepare a coating solution. The coating solution was spread and dried to coat the energy-storable phosphor layer, to form a protective layer (thickness: 3 µm).

| | |
|---|---|
| Polymer material: fluoroolefin-vinyl ether copolymer [Lumiflon LF-504X (30% xylene solution), Asahi Glass Co., Ltd.] | 76 g |
| Cross-linking agent: polyisocyanate [Sumijule N3500 (solid content: 100%), Sumitomo Bayer Urethane, Inc.] | 7.5 g |
| Catalyst: dibutyltin dilaurate [KS1260, Kyodo Yakuhin Co., Ltd.] | 0.25 mg |

Thus-obtained laminate was cut to give a sheet of 200 mm×250 mm. Thus, a radiation image storage panel of the invention comprising a support, a light-reflecting layer, an energy-storable phosphor layer and a protective layer, overlaid in order (see, FIG. 1) was prepared.

EXAMPLES 2 TO 10

The procedures of Example 1 were repeated except for varying the mean particle size (Dm) and the mixing ratio (as set forth in Table 1), to produce radiation image storage panels of the invention.

COMPARISON EXAMPLES 1 TO 5

The procedures of Example 1 were repeated except for varying the mean particle size (Dm) and the mixing ratio (as set forth in Table 1), to produce radiation image storage panels for comparison.

[Evaluation of Radiation Image Storage Panel]

With respect to each produced radiation image storage panel, the scattering length, sensitivity and quality of reproduced radiation image were evaluated in the following manner.

(1) Measurement of Scattering Length Given by Light-reflecting Layer

Three or more film samples having different thicknesses but made of the same material as the light-reflecting layer of each storage panel were prepared. The thickness (μm) and total transmittance (%) of each film sample were measured by means of an automatic recording spectrophotometer (U-3210, Hitachi, Ltd., equipped with an integrating sphere of 150ϕ). The measured transmittance and thickness were placed in the above-described formula (3) based on Kube-luka-Munk theory, to obtain each scattering length. The scattering length was determined at 660 nm and 400 nm, which were representative wavelengths where the maximum peaks of excitation spectra and simulated emission spectra given by the stimulable phosphor were positioned, respectively. The scattering length was found 3.7 μm (at 660 nm) or 3.3 μm (at 400 nm).

(2) Evaluation of Sensitivity and Quality of Reproduced Radiation Image

Each radiation image storage panel was encased in a room light-shielding cassette and then exposed to X-rays emitted from a tungsten tube of the voltage 80 kVp (corresponding to 10 mR). After the storage panel was taken out of the cassette in a dark room, the stimulated emission was released and detected by means of a light-receiver (photomultiplier S-5) in a reading apparatus [stimulating light: semi-conductor laser beam, wavelength: 660 nm, amount of light: 5 J/m$^2$], and the detected stimulated emission was converted into electric signals to measure the amount of the stimulated emission. On the basis of the obtained amount (relative value) of stimulated emission, the sensitivity of the panel was estimated.

The radiation image was then reproduced and output on a film by means of an image-reproducing apparatus. Thus obtained radiation image was visually examined to evaluate the graininess (which depends on structural mottles of the panel). The results of the visual examination were classified into the following four classes. The procedures were then repeated except for employing 0.1 mR of X-rays, to obtain an additional radiation image. The obtained image was visually examined to evaluate the graininess (which depends on quantum noises). The results of the visual examination were classified into the following four classes.

AA: excellent

A: good

B: slightly poor but practically usable

C: too poor to use practically

The results are shown in Table 1.

TABLE 1

| Ex. | Mean size (μm) Small | Mean size (μm) Large | Mixing ratio (wt. %) Small | Mixing ratio (wt. %) Large | Packing degree (vol. %) | Sensitivity (relative value) | Graininess 0.1 mR | Graininess 10 mR |
|---|---|---|---|---|---|---|---|---|
| Ex. 1 | 2.4 | 6.7 | 30 | 70 | 69 | 95 | AA | AA |
| Ex. 2 | 2.4 | 8.0 | 15 | 85 | 71 | 102 | AA | A |
| Ex. 3 | 2.4 | 8.0 | 30 | 70 | 73 | 100 | AA | AA |
| Ex. 4 | 2.4 | 8.0 | 50 | 50 | 71 | 92 | A | AA |
| Ex. 5 | 2.4 | 12 | 30 | 70 | 73 | 105 | AA | A |
| Ex. 6 | 2.8 | 6.7 | 30 | 70 | 69 | 94 | A | AA |
| Ex. 7 | 2.8 | 8.0 | 30 | 70 | 72 | 99 | AA | AA |
| Ex. 8 | 2.8 | 12 | 30 | 70 | 72 | 100 | AA | A |
| Ex. 9 | 3.7 | 8.0 | 30 | 70 | 68 | 95 | A | A |
| Ex. 10 | 3.7 | 12 | 30 | 70 | 70 | 97 | A | A |
| Com. 1 | 1.5 | 5.0 | 30 | 70 | 64 | 65 | C | A |
| Com. 2 | 1.5 | 8.0 | 30 | 70 | 71 | 78 | B | A |
| Com. 3 | 2.4 | 5.0 | 30 | 70 | 64 | 80 | B | A |
| Com. 4 | 2.4 | 8.0 | 5 | 95 | 67 | 94 | A | B |
| Com. 5 | 2.4 | 8.0 | 70 | 30 | 68 | 76 | B | A |
| Com. 6 | 2.4 | 18 | 30 | 70 | 71 | 95 | A | B |
| Com. 7 | 4.5 | 8.0 | 30 | 70 | 65 | 88 | B | B |
| Com. 8 | 4.5 | 18 | 30 | 70 | 69 | 95 | A | C |

The results shown in Table 1 clearly indicate that all the radiation image storage panels of the invention (Examples 1 to 10) had high sensitivities and gave reproduced images of good graininess relating to both structural mottles and quantum noises, as compared with storage panels for comparison (Comparison Examples 1 to 8).

From the results of Comparison Examples 1 to 8, it is also evident that, if the small particles have a mean size of less than 2 μm, the sensitivity remarkably lowered. On the other hand, if the small particles have a mean size of more than 4 μm, the graininess is impaired. Further, if the larger particles have a mean size of less than 6 μm, the packing percentage so lowers that the graininess relating to quantum noises becomes worse. If the large particles have a mean size of more than 15 μm, the graininess relating to structural mottles worsens. In addition, it is also revealed that, if the ratio between the smaller and larger particles is 5:95, the graininess relating to structural mottles also worsens.

What is claimed is:

1. A radiation image storage panel comprising a phosphor layer containing energy-storable phosphor particles and a light-reflecting layer provided on one side of the phosphor layer, wherein the energy-storable phosphor particles comprise two kinds of particles having different mean sizes, one of which comprises smaller particles having a mean size in the range of 2.0 to 4.0 μm and the other of which comprises larger particles having a mean size in the range of 6.0 to 15 μm, and a ratio by weight between the smaller particles and the larger particles is in the range of 10:90 to 50:50 in terms of a former:latter ratio, and wherein the light-reflecting layer gives a scattering length of 5 μm or less, the scattering length being for a stimulating light.

2. The radiation image storage panel of claim 1, wherein the mean size of the smaller phosphor particles is in the range of 2.0 to 3.0 μm and the mean size of the larger phosphor particles is in the range of 6.0 to 10 μm.

3. The radiation image storage panel of claim 1, wherein a packing percentage of the energy-storable phosphor particles in the phosphor layer is 65 vol. % or more.

4. The radiation image storage panel of claim 1, wherein the energy-storable phosphor particles are in the form of tetradecahedron.

5. The radiation image storage panel of claim 1, which further has a support attached to the light-reflecting layer and a transparent protective layer placed on the phosphor layer.

6. The radiation image storage panel of claim 1, wherein the light-reflecting layer comprises particles of light-reflecting material and a binder.

7. The radiation image storage panel of claim 6, the light-reflecting material is alumina.

8. The radiation image storage panel of claim 1, wherein the light-reflecting layer contains a dye.

9. The radiation image storage panel of claim 8, wherein the dye shows a blue color.

10. The radiation image storage panel of claim 1, wherein the phosphor layer shows a light-scattering length in the range of 5 to 20 μm, the light-scattering length being for both of the stimulating light and a stimulated emission.

* * * * *